March 17, 1931.                B. SHARP                1,797,026
                             MILLING CUTTER
                           Filed March 6, 1929

Inventor:
Bertie Sharp

Patented Mar. 17, 1931

1,797,026

UNITED STATES PATENT OFFICE

BERTIE SHARP, OF BIRMINGHAM, ENGLAND, ASSIGNOR OF ONE-HALF TO STANLEY CHARLES ICKE, OF HALLSCROFT, CHURCH STRETTON, SHROPSHIRE, ENGLAND

MILLING CUTTER

Application filed March 6, 1929, Serial No. 344,629, and in Great Britain May 18, 1928.

The present invention has relation to milling cutters, reamers and the like, and their manufacture, more particularly the type of device comprising a body part which is slotted to receive cutting blades, the present invention having for its object to provide for the more secure and generally efficient location of the blades whereby the device is better adapted to withstand the stresses to which it is subjected and its life is generally increased.

According to the present invention, in the manufacture of a milling cutter, reamer or like device, I provide a body part having slots therein and independent cavities or recesses associated with such slots and secure the blades within the slots by initially introducing a brazing compound into the cavities or recesses and heating the blades and adjacent metal of the body, to cause the compound to spread over the blade faces and consolidate the whole, the heating process also performing the function of hardening the blades.

By brazing the blades in position in the manner aforesaid, the necessity of utilizing separate fastening pins or like elements is avoided, with their consequent reduction of metal and weakening of intermediate parts. In this manner a larger number of cutting blades can be introduced on a body part of given dimensions than was heretofore the case.

In order that this invention may be clearly understood and readily carried into practice, reference may be had to the appended explanatory sheet of drawings, upon which:—

Figure 1:
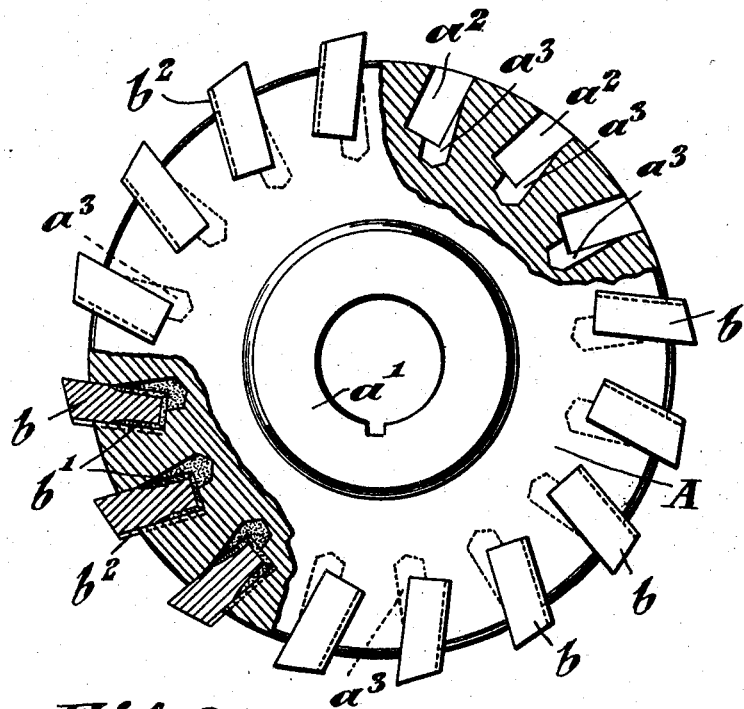
Figure 1 is a sectional elevation of a milling cutter having blades secured according to the present invention.
Figure 2:
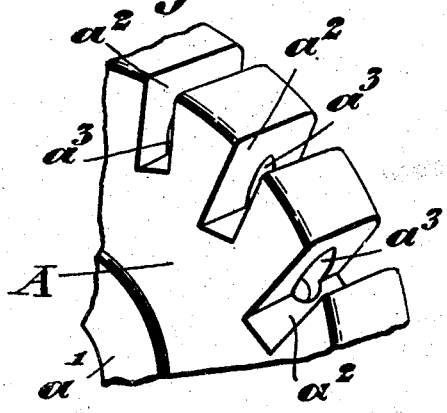
Figure 2 illustrates in perspective a fragment of the slotted body.
Figure 3:
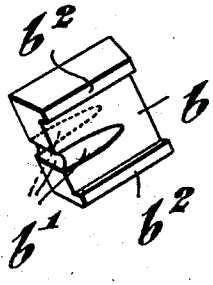

Figure 3 a detached cutting blade in perspective.

In an embodiment of the present invention as applied to a milling cutter, from which its application to a reamer or like device will be readily understood, we employ a flat disc-like body A having a central hollow bearing boss $a^1$, and a series of peripheral slots $a^2$ which are slightly offset from radial planes in well known manner. These slottings are drilled conveniently in a true radial direction as at $a^3$, so that along at least one of the faces a shallow tapering cavity is provided which terminates at the base in a well extending beyond the inner dimension or inner confines of the slot. This drilling and well is filled with a brazing compound, or has a brazing compound introduced therein, and the cutting blade $b$ which is adapted to snugly fit within the slot proper is provided with three facial slots (see particularly Figure 3) and is introduced into the said slot and the whole device subjected to a heating operation, causing the brazing compound to spread entirely over the flat engaging faces of the cutter and very securely consolidate it within the slot. Further, during this heating operation the cutter is hardened.

The cutting blades may, if desired, be flanged as at $b^2$ for location purposes.

The slots $b^1$ in the cutter $b$ may, if desired, be dispensed with, the brazing compound working its way over the face of the tooth without the aid of these slots.

Further, if desired, the cavity or recess $a^3$ associated with the slot $a^2$ may be dispensed with, and the said cavity provided in the cutter $b$, whereby the brazing compound can be located and caused to flow over the engaging faces either with or without the aid of channels or grooves in the tooth or in the slot.

Milling cutters, reamers and like tools constructed according to the present invention are very strong in use, and avoid vibration. Further, on account of their dispensing with any separable pin elements the percentage of blades utilized in a common body part may, as previously stated, be increased with general advantage.

What I claim as my invention and desire to secure by Letters Patent is:—

1. A cutting tool comprising a body having a slot therein and a cutting blade seated within said slot, said body having a brazing material receiving recess opening into said slot and said cutting blade having a brazing compound distributing groove in communication with said recess and extending across the bottom and outwardly along the sides of the blade.

2. A cutting tool comprising a body having a slot therein and a cutting blade seated within said slot, said blade having a brazing material containing and distributing groove extending across the bottom and outwardly along the sides thereof.

3. A cutting tool comprising a body having a slot therein and a cutting blade seated within said slot, said body having a brazing material receiving recess opening into said slot and a wall of said slot having a brazing compound distributing groove in communication with said recess.

In witness whereof I have hereunto set my hand.

BERTIE SHARP.